T. T. PEDDY & G. F. GALLAGHER.
COMBINED DEFLECTOR AND VENTILATOR.
APPLICATION FILED MAR. 7, 1911.
1,025,832.
Patented May 7, 1912.
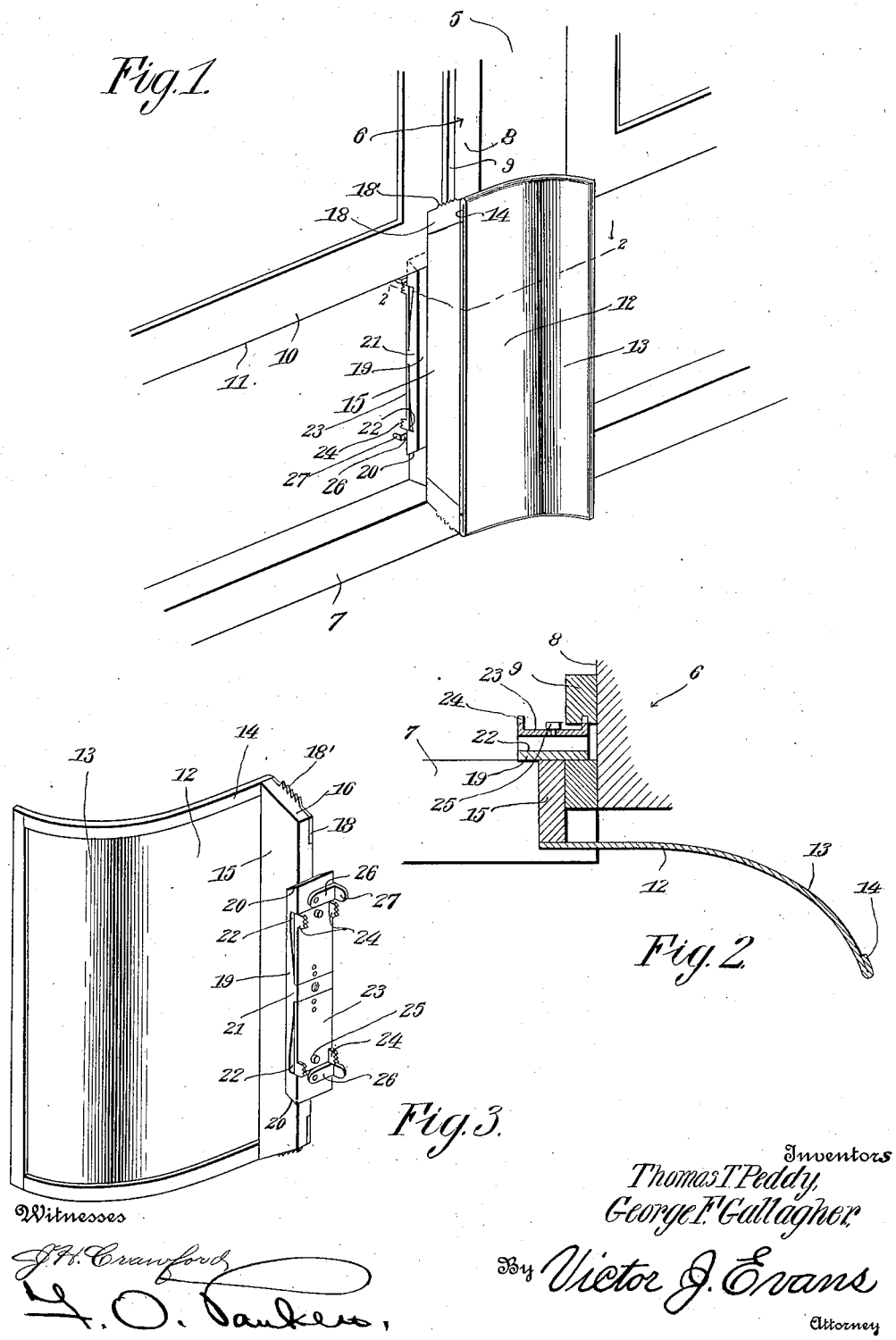
Inventors
Thomas T. Peddy,
George F. Gallagher

UNITED STATES PATENT OFFICE.

THOMAS T. PEDDY, OF BIENVILLE, LOUISIANA, AND GEORGE F. GALLAGHER, OF ROCHESTER, NEW YORK.

COMBINED DEFLECTOR AND VENTILATOR.

1,025,832.   Specification of Letters Patent.   Patented May 7, 1912.

Application filed March 7, 1911. Serial No. 612,779.

*To all whom it may concern:*

Be it known that we, THOMAS T. PEDDY, residing at Bienville, in the parish of Bienville and State of Louisiana, and GEORGE F. GALLAGHER, a resident of Rochester, New York, citizens of the United States, have invented new and useful Improvements in Combined Deflectors and Ventilators, of which the following is a specification.

The invention relates to car window shields, and more particularly to the class of combined deflectors and ventilators for railway car windows, automobiles, or the like.

The primary object of the invention is the provision of a device of this nature in which dust, and cinders will be excluded from the windows of a car during the travel of a car, and at the same time permitting proper ventilation to such car.

Another object of the invention is the provision of a device of this character in which a car window may be opened and dust and cinders prevented from entering the car, the device being reversible, so that it may be mounted at either side of the window casement, thereby excluding dust, cinders and other flying particles from the car, irrespective of the direction of travel of the same.

A further object of the invention is the provision of a device of this character in which the guard member thereof is provided with a curvature near the free outer edge thereof, so as to properly deflect dust and cinders striking the same during the advancement of a car, and thereby obviating the possibility of the entrance of the dust or cinders to the interior of the car, and that will permit the opening of the window for the free circulation of air within the car, the device being securely held to the window casement, so as to avoid the annoyance resultant from the rattling thereof during the transit of the train.

A still further object of the invention is the provision of a device of this character which is simple of construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a fragmentary perspective view of a car and one of its windows, showing the device mounted in proper position. Fig. 2 is a horizontal sectional view on the line 2—2 of Fig. 1. Fig. 3 is a fragmentary perspective view of the device, looking toward the rear thereof.

Similar reference characters indicate corresponding parts throughout the several views of the drawings.

Referring to the drawings by numerals, 5 designates a portion of a car body of the ordinary well-known construction, having the usual window casement 6, provided with an outwardly sloping base sill 7, side stiles 8, to which are connected the usual spaced vertical guide strips 9 at the inner face thereof, and between which is movably mounted a window sash 10, the latter being raised and lowered in the ordinary well-known manner, and has its lower edge outwardly beveled, as at 11, correspondingly to the sloping sill of the window casement.

Detachably and reversibly mounted upon the window casement, is a combined deflector and ventilator, comprising a concaved shield or deflector plate 12, the curvature 13 therein being disposed contiguous to the outer free edge thereof and extends longitudinally throughout the length of the same, the top, bottom and outer free edge of the plate 12 being inwardly and downwardly bent to provide marginal flanges 14, serving to strengthen and give rigidity to the said plate. At the inner edge of the plate and secured parallel therewith to the inner face of the same, is a strip 15, the opposite ends of which are reversely beveled, as at 16, on inwardly converging lines correspondingly to the sloping angle of the base sill 7, so that either of the said beveled ends 16 may rest upon the base sill on the application of the combined deflector and ventilator to the window.

Secured to the outer face of the strip are metallic plates 18, the same being disposed in inwardly converging relation to each other and mounted in suitable counter seats formed in the outer face of the strip 15, so as to lie flush therewith, the outer edges of the said plates being correspondingly beveled to the beveled ends 16 of the strip and are provided with a series of teeth 18, which latter bite into the base sill 7 of the casement when either beveled end 16 of the strip 15 is resting thereon.

Secured to the free edge of the strip 15, medially thereof, and at right angles to the same, is a cleat 19, the ends of which are outwardly beveled, as at 20, whereby either of the beveled ends 20 may be engaged with the beveled lower edge 11 of the window sash when the cleat is inserted between the guide strips 9 on the inner faces of the side stiles 8 of the said window casement, thus retaining the shield in proper position with respect to the said window casement, as is clearly shown in Fig. 1 in the drawing.

The cleat 19 in its outer face is cut away to form a bulged convex center portion 21 and outer rabbeted portions 22, in which latter work yieldable catches, comprising spring fingers 23, the same being connected at their inner ends to the bulged center portion 21 of the cleat 19, while their outer free ends are formed with outturned opposed serrated lips 24, which are adapted to bite into the adjacent guide strip 9 for securely locking the cleat 19 between the guide strips on the window casement.

Secured to the spring fingers 23 and projecting from the outer faces thereof are buttons 25, the same being disposed near the outer free ends thereof, and are adapted to be engaged and released by means of swinging clips 26 pivoted to and near the beveled ends of the cleat 19, the outer ends of the clips being provided with outturned ears 27, whereby they may be freely engaged with the hand of an operator for the shifting thereof, the clips 26, when engaged with the buttons 25, serving to sustain the spring fingers 23 retracted within the rabbeted portions 22 in the cleat 19, thus permitting the insertion of the said cleat between the guide strips 9 on the window casement or its removal therefrom, in the mounting and dismounting of the combined deflector and ventilator upon and from the window of the car.

It is believed that the manner of reversibly mounting the combined deflector and ventilator in the window will be clearly obvious, without requiring a more extended explanation thereof, and therefore the same has been omitted.

It is obvious that the deflector and ventilator may be attached to automobiles or other vehicles without altering or varying the construction thereof. Therefore, it is to be understood that the said invention is not limited to the use herein named.

What is claimed is:

1. A combined reversible and detachable deflector and ventilator for car windows, comprising a concaved shield plate having its curvature near the outer free edge thereof, a strip secured to the inner free edge of the plate and arranged at an angle thereto and having inwardly converging beveled end edges, gripping means carried at the beveled edges of the strip for biting into the base sill of a window casing, a cleat fixed to and at right angles with respect to the strip and having outwardly beveled end edges, reversely extending leaf springs fixed to the cleat and having spaced outturned toothed ears for the locking of the cleat between the guide strips of such window casing and sustaining the shield plate relative thereto.

2. A combined reversible and detachable deflector and ventilator for car windows, comprising a concaved shield plate having its curvature near the outer free edge thereof, a strip secured to the inner free edge of the plate and arranged at an angle thereto and having inwardly converging beveled end edges, gripping means carried at the beveled edges of the strip for biting into the base sill of a window casing, a cleat fixed to and at right angles with respect to the strip and having outwardly beveled end edges, the said beveled edges of the cleat being adapted for engagement by the sash of a window, reversely extending leaf springs fixed to the cleat and having spaced outturned toothed ears for the locking of the cleat between the guide strips of such window casing and sustaining the shield plate relative thereto, and clips acting upon the said leaf spring to hold the same in normal retracted position on the cleat.

In testimony whereof we affix our signatures in presence of two witnesses.

THOMAS T. PEDDY.
GEO. F. GALLAGHER.

Witnesses:
C. W. HAMNER,
R. F. PARNELL.

---

Copies of this patent may be obtained for five cents each, by addressing the "Commissioner of Patents, Washington, D. C."